United States Patent
Wu et al.

(10) Patent No.: US 11,021,273 B1
(45) Date of Patent: Jun. 1, 2021

(54) UNIFIED SPACECRAFT PROPELLANT MANAGEMENT SYSTEM FOR CHEMICAL AND ELECTRIC PROPULSION

(71) Applicant: Space Systems/Loral, LLC, Palo Alto, CA (US)

(72) Inventors: Gordon Wu, Lafayette, CO (US); David Marlow, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 335 days.

(21) Appl. No.: 15/970,693

(22) Filed: May 3, 2018

(51) Int. Cl.
*B64G 1/40* (2006.01)
*F17C 13/04* (2006.01)
*F03H 1/00* (2006.01)
*F02K 9/50* (2006.01)
*F17C 13/00* (2006.01)

(52) U.S. Cl.
CPC ............. *B64G 1/402* (2013.01); *B64G 1/405* (2013.01); *F02K 9/50* (2013.01); *F03H 1/0012* (2013.01); *F17C 13/008* (2013.01); *F17C 13/04* (2013.01); *F17C 2221/016* (2013.01); *F17C 2270/0194* (2013.01)

(58) Field of Classification Search
CPC . F02K 9/44; F02K 9/50; F03H 1/0012; B64G 1/402
See application file for complete search history.

(56) References Cited

U.S. PATENT DOCUMENTS

| | | | | |
|---|---|---|---|---|
| 4,385,489 A | * | 5/1983 | Abbott | F02K 9/50 60/39.48 |
| 4,743,278 A | | 5/1988 | Yeh | |
| 5,251,852 A | * | 10/1993 | Pulkowski | B64G 1/26 244/135 C |
| 5,651,515 A | * | 7/1997 | Saccoccia | B64G 1/007 244/158.5 |
| 6,082,678 A | * | 7/2000 | Maute | B64G 1/007 244/164 |
| 6,113,035 A | * | 9/2000 | Hubert | B64G 1/26 244/169 |
| 6,264,145 B1 | * | 7/2001 | Maute | B64G 1/007 244/171.1 |
| 6,739,555 B2 | * | 5/2004 | Mazanek | B64G 1/1078 244/172.4 |
| 9,145,216 B2 | | 9/2015 | Gascon et al. | |

(Continued)

*Primary Examiner* — Joseph W Sanderson
(74) *Attorney, Agent, or Firm* — Weaver Austin Villeneuve & Sampson LLP (57) ABSTRACT

A spacecraft includes a propulsion system that includes one or more pressurant tanks configured to store an inert gas at a high pressure, one or more propellant tanks configured to store liquid propellant at an intermediate pressure, electric thrusters operable with the inert gas at a low pressure and pneumatically coupled with the one or more pressurant tanks by way of a first pressure regulator, and chemical thrusters operable with the liquid propellant. The inert gas is one or a mixture of two or more of xenon, argon and krypton. At least a portion of the liquid propellant is stored in at least one of the propellant tanks, the propellant tank including an ullage volume pneumatically coupled with at least one of the pressurant tanks by way of a second pressure regulator having an output set to the intermediate pressure and the ullage volume is pressurized by the inert gas.

20 Claims, 4 Drawing Sheets

(56) References Cited

U.S. PATENT DOCUMENTS

| | | | |
|---|---|---|---|
| 9,650,996 B2* | 5/2017 | Smith | B64G 1/60 |
| 9,908,641 B2* | 3/2018 | Fontaine | F02K 9/50 |
| 10,180,118 B2* | 1/2019 | Berg | F02K 9/52 |
| 10,336,475 B1* | 7/2019 | Delgado | B64G 1/401 |
| 10,589,879 B2* | 3/2020 | Baldwin | B64G 1/641 |
| 10,605,204 B2* | 3/2020 | Biblarz | F02K 9/50 |
| 2008/0135685 A1 | 6/2008 | Soldi et al. | |
| 2009/0229240 A1 | 9/2009 | Goodfellow | |
| 2013/0047578 A1 | 2/2013 | Gascon et al. | |
| 2013/0327015 A1* | 12/2013 | Pollet | B64G 1/401 60/244 |
| 2015/0027102 A1* | 1/2015 | Bahn | F02K 9/425 60/258 |
| 2016/0001898 A1 | 1/2016 | Duchemin et al. | |
| 2016/0016677 A1* | 1/2016 | Fontaine | F02K 9/50 60/259 |
| 2016/0265477 A1* | 9/2016 | Smith | B64G 1/402 |
| 2016/0281641 A1* | 9/2016 | Danguy | F02K 9/50 |
| 2017/0088293 A1 | 3/2017 | Zurbach et al. | |
| 2017/0191471 A1 | 7/2017 | Berg et al. | |
| 2018/0354659 A1* | 12/2018 | Baldwin | B64G 1/002 |
| 2020/0011275 A1* | 1/2020 | Biblarz | F02K 9/972 |

\* cited by examiner

UNIFIED SPACECRAFT PROPELLANT MANAGEMENT SYSTEM FOR CHEMICAL AND ELECTRIC PROPULSION

TECHNICAL FIELD

This invention relates generally to a spacecraft propulsion system, and, more particularly, to a unified spacecraft propellant management system for chemical and electric propulsion.

BACKGROUND

The assignee of the present invention manufactures and deploys spacecraft for, inter alia, communications and broadcast services.

Such spacecraft are equipped with on board propulsion systems, including chemical or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

Spacecraft thrusters may be broadly categorized as either "chemical" or "electric" based on the respective primary energy source. Chemical thrusters suitable for spacecraft propulsion systems accelerate combustion or decomposition products of liquid propellants such as hydrazine and nitrogen tetroxide, but such thrusters are generally incapable of operating at a specific impulse ($I_{sp}$) higher than 500 seconds. Electric thrusters may operate at an $I_{sp}$ of 1000-4000 seconds, by using spacecraft power to ionize high atomic number inert gases such as xenon or krypton and accelerate the resulting ions. Spacecraft power constraints, at least practically, constrain thrust levels to well less than one newton.

An electric thruster, as contemplated by the present disclosure, may be or include, for example, a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle. In some implementations, the electric thruster may be Hall Effect thrusters (HET) such as a stationary plasma thruster (SPT) and may be referred to herein as a "plasma thruster".

For a number of existing or foreseen spacecraft, at least most orbit raising is performed using chemical thrusters, whereas stationkeeping, and momentum management operations (performed after orbit raising) are executed using electric thrusters.

SUMMARY

The presently disclosed techniques, advantageously, reduce the number of high pressure tanks required to support a mixed mission profile that includes both chemical thruster and electric thruster operation.

According to some implementations, a spacecraft includes a propulsion system, the propulsion system including: one or more pressurant tanks configured to store an inert gas at a high pressure; one or more propellant tanks configured to store liquid propellant at an intermediate pressure; one or more electric thrusters operable with the inert gas at a low pressure and pneumatically coupled with the one or more pressurant tanks by way of a first pressure regulator having a low pressure output; and one or more chemical thrusters operable with the liquid propellant. The inert gas is one or a mixture of two or more of xenon, argon and krypton. At least a portion of the liquid propellant is stored in at least one of the propellant tanks, the propellant tank including an ullage volume. The ullage volume is pneumatically coupled with at least one of the pressurant tanks by way of a second pressure regulator having an output set to the intermediate pressure. The ullage volume is pressurized by the inert gas.

In some examples, the propellant tank may include a diaphragm separating the liquid propellant from the ullage volume.

In some examples, the intermediate pressure may be at least two times higher than the low pressure.

In some examples, the one or more electric thrusters may be pneumatically coupled with the one or more pressurant tanks by way of a first commandable valve and the first pressure regulator, and the ullage volume may be pneumatically coupled with at least one of the pressurant tanks by way of a second commandable valve and the second pressure regulator. In some examples, the ullage volume may be pneumatically coupled with the one or more electric thrusters by way of a third commandable valve and the first pressure regulator. In some examples, during a first mission phase, the first commandable valve, the second commandable valve and the third commandable valve may be configured to maintain a regulated intermediate pressure during operation of the chemical thrusters, during a second mission phase, the first commandable valve, the second commandable valve and the third commandable valve may be configured to permit flow of some or all of the first portion of inert gas from the ullage volume to the first pressure regulator for operation of the electric thrusters, and, during a third mission phase, the first commandable valve, the second commandable valve and the third commandable valve may be configured to permit flow of a second portion of the inert gas from the pressurant tanks to the first pressure regulator for operation of the electric thrusters. In some examples, during a first mission phase, the second commandable valve may be open and the first commandable valve and the third commandable valve may be closed, during a second mission phase, the first and second commandable valves may be closed and the third commandable valve may be opened, and, during a third mission phase, the first commandable valve may be open and the second and third commandable valves may be closed. In some examples, at least a portion of the third mission phase may be subsequent to the second mission phase.

In some examples, the electric thruster may be or include one or more of a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle.

In some examples, the high pressure may be in the range of 50-300 bar, the low pressure is in the range of 1-4 bar, and the intermediate pressure is in the range of 10-30 bar.

According to some implementations, a method includes operating a spacecraft, the spacecraft including a propulsion system, the propulsion system including: one or more pressurant tanks configured to store an inert gas at a high pressure, the inert gas being one or a mixture of two or more of xenon, argon and krypton; one or more propellant tanks configured to store liquid propellant at an intermediate pressure; one or more electric thrusters operable with the inert gas and pneumatically coupled with the one or more pressurant tanks by way of a first pressure regulator having a low pressure output; and one or more chemical thrusters operable with the liquid propellant Operating the spacecraft includes: storing the liquid propellant in at least one of the propellant tanks, the propellant tank including an ullage volume that is pneumatically coupled with at least one of the pressurant tanks by way of a second pressure regulator having an output set to the intermediate pressure and pressurizing the ullage volume with a first portion of the inert gas.

In some examples the method may further include, during a first mission phase, operating the chemical thrusters with the liquid propellant, and, during a second mission phase, operating the electric thrusters with the first portion of the inert gas. In some examples, the one or more electric thrusters may be pneumatically coupled with the one or more pressurant tanks by way of a first commandable valve and the first pressure regulator, and the ullage volume may be pneumatically coupled with at least one of the pressurant tanks by way of a second commandable valve and the second pressure regulator. In some examples, the intermediate output pressure setting may be at least two times higher than the low output pressure. In some examples, the ullage volume may be pneumatically coupled with the one or more electric thrusters by way of a third commandable valve and the first pressure regulator. In some examples, the method may further include operating, during a third mission phase, the electric thrusters with a second portion of the inert gas, wherein the electric thrusters receive the second portion from at least one of the pressurant tanks by way of the first commandable valve and the first pressure regulator.

In some examples, the propellant tank may include a diaphragm separating the liquid propellant from the ullage volume.

According to some implementations, a spacecraft includes a propulsion system, the propulsion system including: one or more propellant tanks configured to store liquid propellant, the propellant tank including an ullage volume pressurized by an inert gas; one or more electric thrusters operable with the inert gas at a low pressure and pneumatically coupled with the one or more propellant tanks by way of a first pressure regulator having a low pressure output; and one or more chemical thrusters operable with the liquid propellant. The inert gas is one or a mixture of two or more of xenon, argon and krypton.

In some examples, the propellant tank may include a diaphragm separating the liquid propellant from the ullage volume.

In some examples, the ullage volume may be pneumatically coupled with the one or more electric thrusters by way of a commandable valve and the first pressure regulator.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The presently disclosed techniques contemplate reducing the number of high pressure tanks required to support a mixed mission profile that includes both chemical thruster and electric thruster operation. In some implementations, a tankage arrangement is configured such that a quantity of high atomic number inert gas is available both to pressurize an ullage volume of liquid chemical propellant tanks during a first mission phase and then as a propellant for electric thrusters during a subsequent mission phase.

Figure 1:
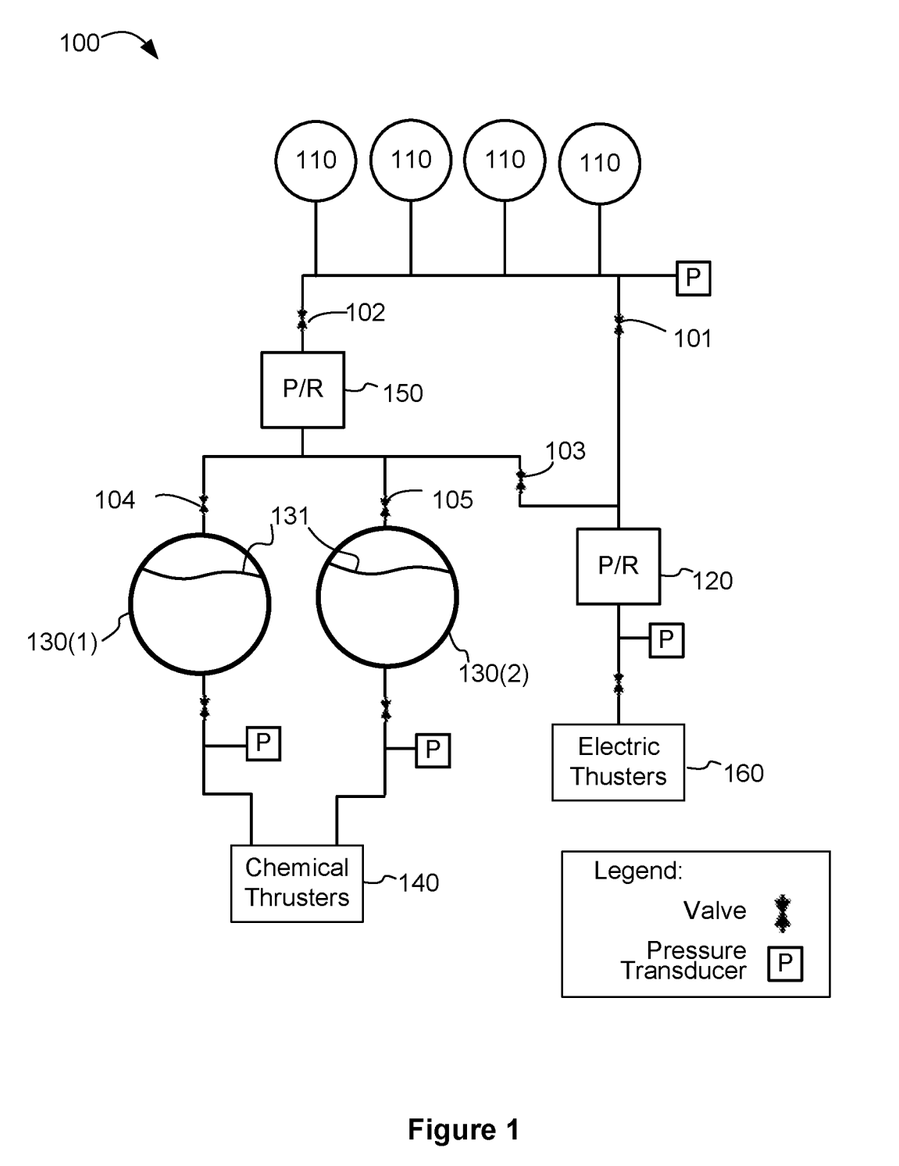
FIG. 1 illustrates a simplified block diagram of a spacecraft, according to an implementation.

FIG. 1 illustrates a simplified block diagram of a spacecraft, according to an implementation. In the illustrated implementation, a spacecraft 100 includes high pressure tanks 110 that are pneumatically coupled, by way of a first commandable valve 101 and a first pressure regulator (P/R) 120 with electric thrusters 160. The high pressure tanks 110 are also pneumatically coupled, by way of a second commandable valve 102 and a second pressure regulator 150 with liquid propellant tanks 130. The high pressure tanks 110 may be configured to store a quantity of an inert gas with a high atomic number, such as xenon, argon or krypton, for example. In some implementations, the high pressure tanks may have a maximum expected operating pressure in the range of 50-300 bar. In some implementations, the high pressure tanks may have a maximum expected operating pressure of at least 100 bar. The electric thruster 160 may be operable with the inert gas. For example, the electric thrusters 160 may be configured to ionize the inert gas, and accelerate the resulting ions to produce thrust. Chemical thrusters 140 may be coupled so as to receive liquid propellant from the liquid propellant tanks 130. In the illustrated implementation, the chemical thrusters 140 may be bipropellant thrusters and may be configured to receive a liquid fuel from a first propellant tank 130(1) and to receive a liquid oxidizer from a second propellant tank 130(2).

Each liquid propellant tank 130 may include a respective volume of propellant and a respective ullage volume and may include a propellant management device that separates liquid propellant contained within the tank from pressurant gas within the ullage volume. Thus, in each liquid propellant tank, the respective ullage volume and the respective volume of propellant may be separated. For example, a diaphragm 131 within the liquid propellant tank 130 may provide a barrier between the liquid propellant and the pressurant. The diaphragm 131 may be elastomeric, or otherwise expandable, so that, as liquid propellant is consumed by the chemical thrusters, the ullage volume increases.

The first commandable valve 101 and the second commandable valve 102 may be, for example, latching valves. By appropriate commands, the valves 101 and 102 may be configured to selectively couple the xenon tanks 110 with either or both of the first pressure regulator 120 and the second pressure regulator 150. The second pressure regulator 150 may provide a regulated output pressure at least two times higher than a regulated output pressure of the first pressure regulator 120. For example, in some implementations, the second pressure regulator 150 may be configured to provide a regulated output pressure on the order of 10-30 bar (the "intermediate pressure"), whereas the first pressure regulator 120 may be configured to provide a regulated output pressure on the order of 1-4 bar (the "low pressure").

Additional commandable valves, which may also be latching valves, for example, may be configured, by appropriate commands, to selectively couple one or both of the liquid propellant tanks 130(1) and 130(2) with an input of the first pressure regulator 120. More particularly, a third commandable valve 103 may be disposed between the input of the first pressure regulator 120 and respective ullage volumes of propellant tanks 130(1) and 130(2) such that the ullage volumes may be, when desired, pneumatically coupled with the first pressure regulator 120. Optionally, as illustrated in the example of FIG. 1, commandable valve 104 and 105 may be disposed between the respective ullage volumes of propellant tanks 130(1) and 130(2) such that the inert gas may flow from a selected one of the ullage volumes to the first pressure regulator 120.

As a result, inert gas from the respective ullage volume of propellant tanks 130(1) and 130(2) may be transferred to the first pressure regulator 120 for use by the electric thrusters 160. More particularly, the inert gas that may be used in a first mission phase to maintain an ullage volume pressure of a liquid propellant tank at the intermediate pressure may be subsequently used by the electric thrusters 160.

Figure 2:
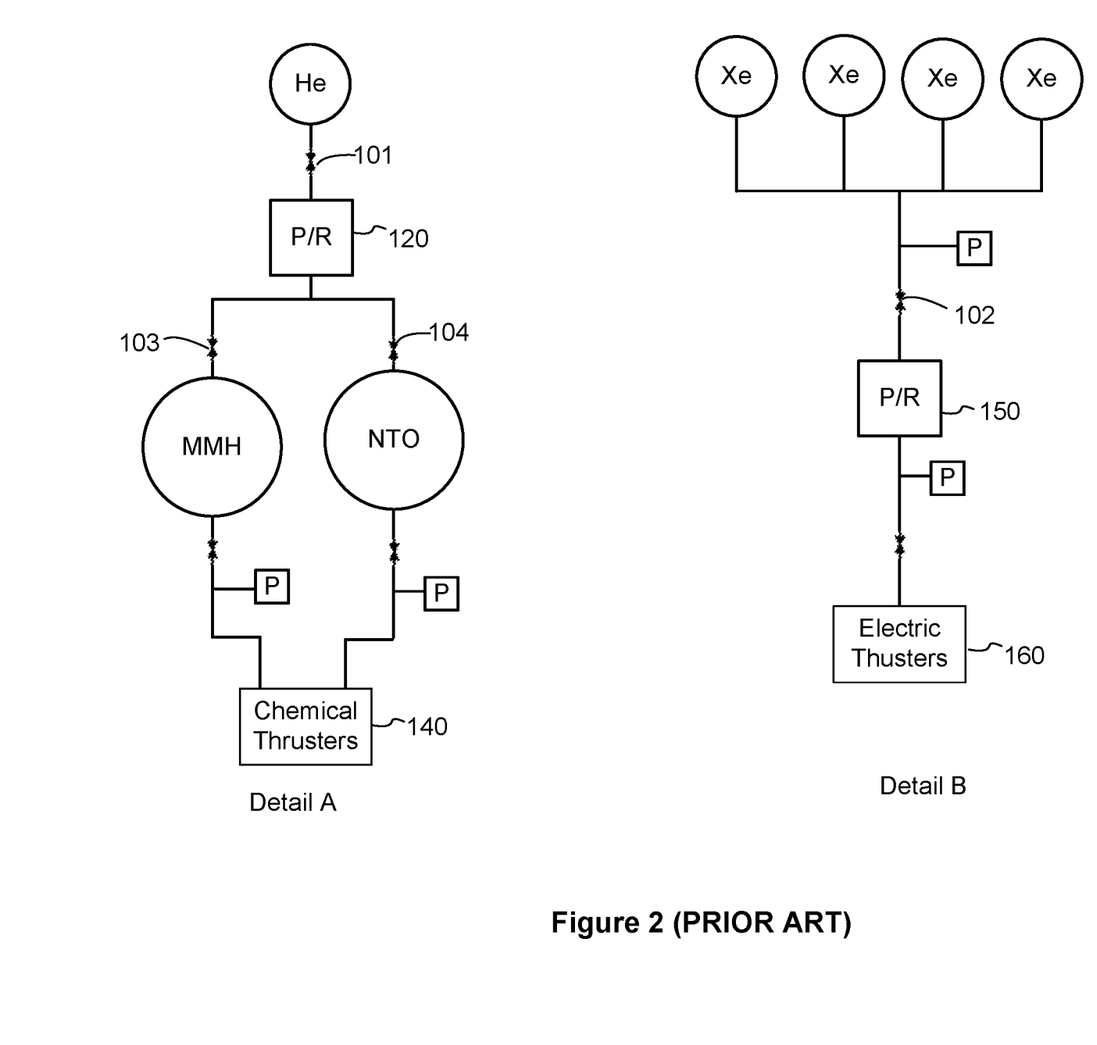
FIG. 2 illustrates examples of conventional chemical and electric propulsion subsystems.

Features and benefits of the presently disclosed techniques may be better appreciated by considering FIG. 2. Detail A of FIG. 2 illustrates a conventional chemical propulsion subsystem including two propellant tanks (one fuel, monomethyl hydrazine (MMH), and one oxidizer, nitrogen tetroxide (NTO)) pneumatically coupled by way of a pressure regulator (P/R) with a pressurant tank. Conventionally, such chemical propulsions subsystems use helium (He) as a pressurant because of helium's low atomic mass. Detail B illustrates xenon (Xe) propellant tanks pneumatically coupled by way of a pressure regulator with electric thrusters. As indicated above, electric thrusters are preferably operated with a high atomic number inert gas, in the illustrated example xenon (Xe). The helium pressurant tank and xenon tanks may be configured to store gas at an initial high pressure above 100 bar, and respective regulators may be configured to reduce the pressure as required. In a typical example, electric thrusters of the electric propulsion subsystem may operate at a regulated low pressure of about 2.5 bar whereas thrusters of the chemical propulsion subsystem may operate at a regulated intermediate pressure of about 17 bar. Although the mass of helium for a typical mission may be relatively small (e.g., 5-7 kg, typically), the tankage mass and associated structural hardware may amount to 30 kg or more.

Comparing FIG. 2 and FIG. 1, it will be appreciated that the presently disclosed techniques permit to avoid the mass and cost of the tankage and associated structural hardware that would ordinarily be required to provide a dedicated pressurant for the liquid propellant tanks. More particularly, a first portion of the inert gas may be used in a first mission phase to maintain a regulated intermediate pressure during operation of the chemical thrusters. Subsequently, during a second mission phase the first portion of the inert gas may be allowed to flow from the ullage volume to the first pressure regulator for operation of the electric thrusters. During a third mission phase, a portion or all of which may be prior or subsequent to the second phase, a second portion of the inert gas may be allowed to flow from the pressurant tanks to the first pressure regulator for operation of the electric thrusters.

Figure 3:
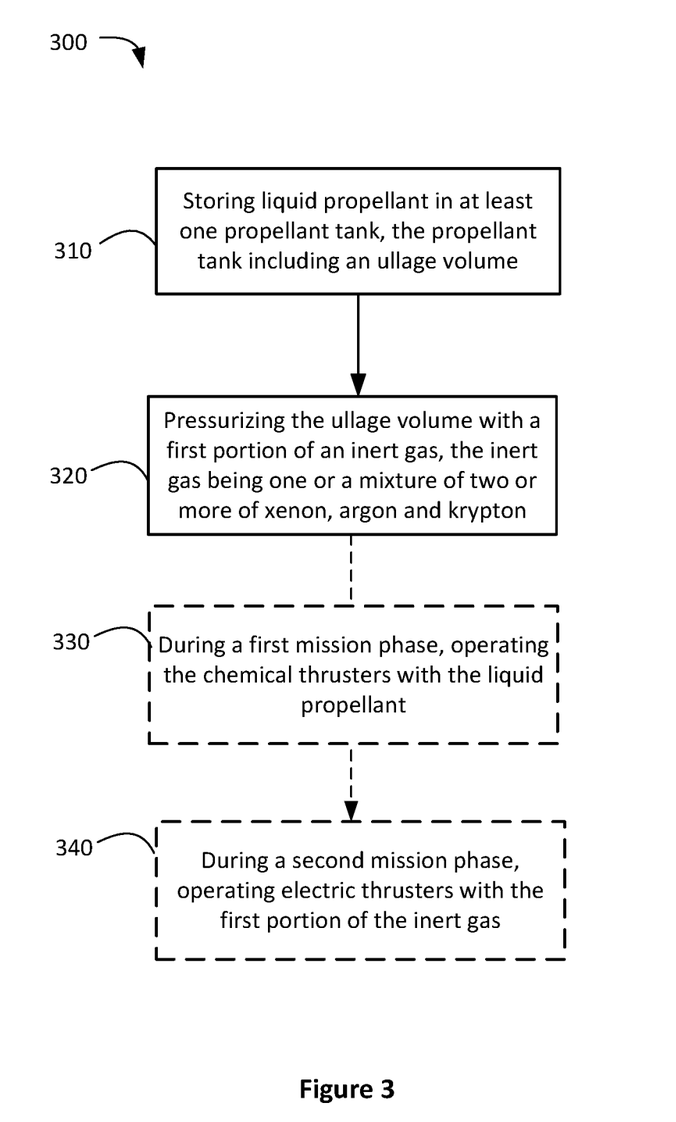
FIG. 3 illustrates a process flow diagram for operating a spacecraft, according to an implementation.

FIG. 3 illustrates a process flow diagram for operating a spacecraft. The spacecraft, as described hereinabove, may include a propulsion system that includes one or more pressurant tanks configured to store an inert gas at a high pressure, the inert gas being one or a mixture of xenon, argon and krypton, one or more propellant tanks configured to store liquid propellant at an intermediate pressure, one or more electric thrusters operable with the inert gas and pneumatically coupled with the one or more pressurant tanks by way of a first pressure regulator having a low pressure output, and one or more chemical thrusters operable with the liquid propellant. A method 300 may start, at block 310, with storing the liquid propellant in at least one propellant tank, the propellant tank including an ullage volume that is pneumatically coupled with at least one of the pressurant tanks by way of a second pressure regulator having an output set to the intermediate pressure. The method 300 may continue, at block 320 with pressurizing the ullage volume with a first portion of inert gas the inert gas being one or a mixture of two or more of xenon, argon and krypton. For example, referring now to FIG. 1, commandable valves 102, 103, 104 and 105 may be commanded such that commandable valve 103 is closed and commandable valves 102, 104 and 105 are open.

Optionally, referring again to FIG. 3, the method 300 may continue, at block 320, with operating, during a first mission phase, the chemical thrusters with the liquid propellant. Optionally, the method 300 may further continue with operating, during a second mission phase, the electric thrusters with the first portion of the inert gas. For example, referring again to FIG. 1, commandable valves 101, 102, 103, 104 and 105 may be commanded such that commandable valves 101 and 102 are closed and commandable valves 103, 104 and 105 are open.

Figure 4:
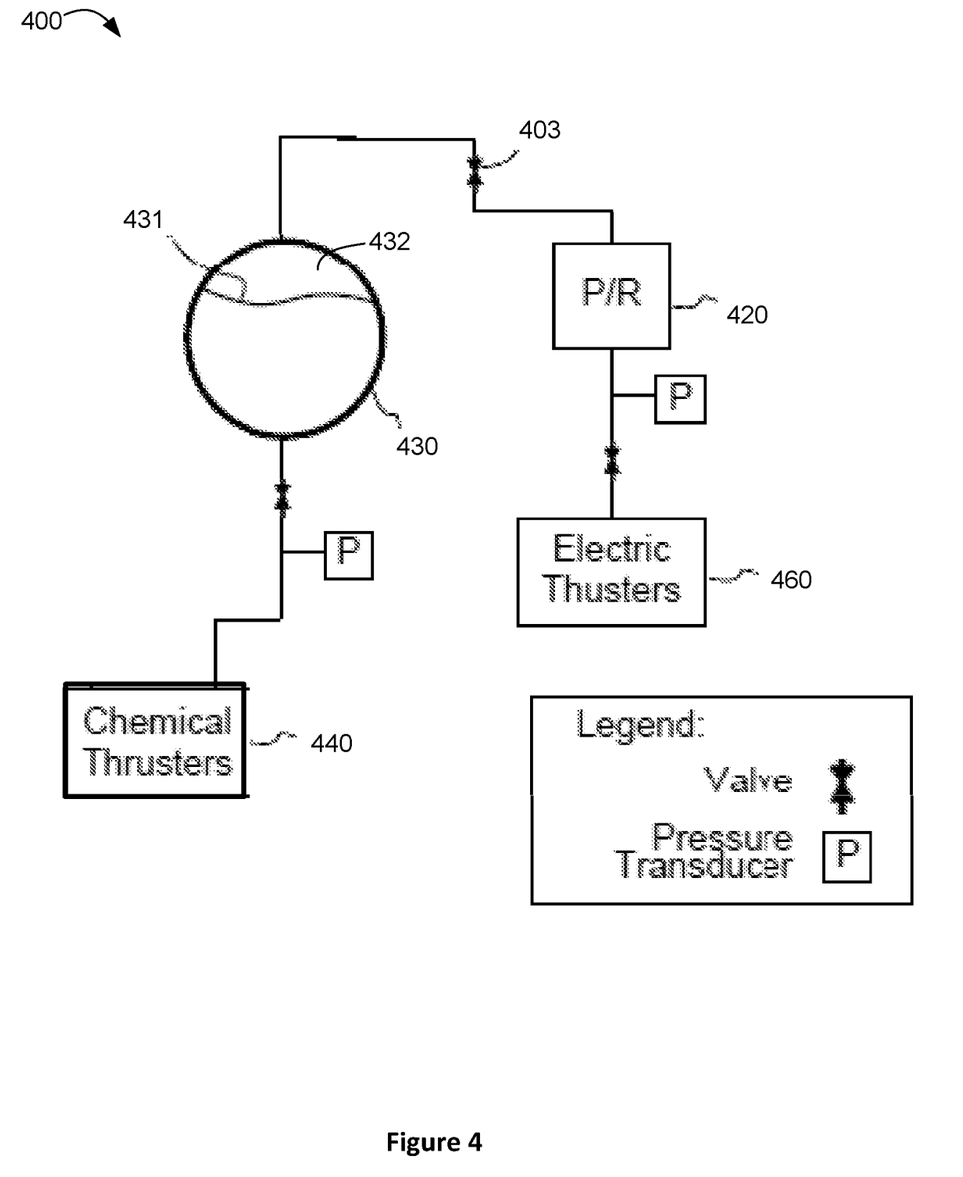
FIG. 4 illustrates a simplified block diagram of a spacecraft, according to another implementation.

FIG. 4 illustrates a simplified block diagram of a spacecraft, according to another implementation. In the illustrated implementation, a spacecraft 400 includes at least one liquid propellant tank 430 configured to store liquid propellant, the propellant tank including an ullage volume 432 pressurized by an inert gas. The inert gas may be xenon, argon or krypton, for example. The spacecraft includes one or more electric thrusters 460 that are operable with the inert gas. For example, the electric thrusters 460 may be configured to ionize the inert gas, and accelerate the resulting ions to produce thrust. The electric thrusters 460 are pneumatically coupled with the propellant tank 430 by way of pressure regulator 420. The pressure regulator 420 may be configured to reduce pressure of inert gas received from the propellant tank 430 to a low pressure appropriate for use by the electric thrusters 460. Chemical thrusters 440 may be coupled so as to receive liquid propellant from the liquid propellant tanks 430.

Each liquid propellant tank 430 may include a respective volume of propellant and a respective ullage volume and may include a propellant management device that separates liquid propellant contained within the tank from pressurant gas within the ullage volume. Thus, in each liquid propellant tank 430, the respective ullage volume and the respective volume of propellant may be separated. For example, a diaphragm 431 within the liquid propellant tank 430 may provide a barrier between the liquid propellant and the pressurant. The diaphragm 431 may be elastomeric, or otherwise expandable, so that, as liquid propellant is consumed by the chemical thrusters, the ullage volume increases.

In some implementations, at least one commandable valve, which may be a latching valve, for example, may be configured, by appropriate commands, to selectively couple the liquid propellant tank 430 with an input of the pressure regulator 420. In the illustrated implementation, commandable valve 403 may be disposed between the input of the pressure regulator 420 and the ullage volume 432 of propellant tank 430 such that the ullage volume 430 may be, when desired, pneumatically coupled with the first pressure regulator 420.

As a result, inert gas from the ullage volume of propellant tank 430 may be transferred to the pressure regulator 420 for use by the electric thrusters 460. More particularly, the inert gas that may be used in a first mission phase to maintain an ullage volume pressure of a liquid propellant tank at the intermediate pressure may be subsequently used by the electric thrusters 160.

Thus, techniques for unifying a spacecraft propellant management for chemical and electric propulsion have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
  a propulsion system, the propulsion system including:
    one or more pressurant tanks configured to store an inert gas at a high pressure;
    one or more propellant tanks configured to store liquid propellant at an intermediate pressure;
    one or more electric thrusters operable with the inert gas at a low pressure and pneumatically coupled with the one or more pressurant tanks by way of a first pressure regulator having a low pressure output; and
    one or more chemical thrusters operable with the liquid propellant; wherein:
      the inert gas is one or a mixture of two or more of xenon, argon and krypton;
      at least a portion of the liquid propellant is stored in at least one of the propellant tanks, the propellant tank including an ullage volume;
      the ullage volume is pneumatically coupled with at least one of the pressurant tanks by way of a second pressure regulator having an output set to the intermediate pressure;
      the one or more electric thrusters are pneumatically coupled with the ullage volume by way of the first pressure regulator; and
      the ullage volume is pressurized by a first portion of the inert gas.

2. The spacecraft of claim 1, wherein the propellant tank includes a diaphragm separating the liquid propellant from the ullage volume.

3. The spacecraft of claim 1, wherein the intermediate pressure is at least two times higher than the low pressure.

4. The spacecraft of claim 1, wherein
  the one or more electric thrusters are pneumatically coupled with the one or more pressurant tanks by way of a first commandable valve and the first pressure regulator; and
  the ullage volume is pneumatically coupled with at least one of the pressurant tanks by way of a second commandable valve and the second pressure regulator.

5. The spacecraft of claim 4, wherein the ullage volume is pneumatically coupled with the one or more electric thrusters by way of a third commandable valve and the first pressure regulator.

6. The spacecraft of claim 5, wherein:
  during a first mission phase, the first commandable valve, the second commandable valve and the third commandable valve are configured to maintain a regulated intermediate pressure during operation of the chemical thrusters;
  during a second mission phase, the first commandable valve, the second commandable valve and the third commandable valve are configured to permit flow of some or all of the first portion of inert gas from the ullage volume to the first pressure regulator for operation of the electric thrusters; and
  during a third mission phase, the first commandable valve, the second commandable valve and the third commandable valve are configured to permit flow of a second portion of the inert gas from the pressurant tanks to the first pressure regulator for operation of the electric thrusters.

7. The spacecraft of claim 5, wherein:
  during a first mission phase, the second commandable valve is open and the first commandable valve and the third commandable valve are closed;
  during a second mission phase, the first and second commandable valves are closed and the third commandable valve is opened; and
  during a third mission phase, the first commandable valve is open and the second and third commandable valves are closed.

8. The spacecraft of claim 6, wherein at least a portion of the third mission phase is subsequent to the second mission phase.

9. The spacecraft of claim 1, wherein the electric thruster is or includes one or more of a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle.

10. The spacecraft of claim 1, wherein the high pressure is in the range of 50-300 bar, the low pressure is in the range of 1-4 bar, and the intermediate pressure is in the range of 10-30 bar.

11. A method comprising:
  operating a spacecraft, the spacecraft including a propulsion system, the propulsion system including:
    one or more pressurant tanks configured to store an inert gas at a high pressure, the inert gas being one or a mixture of two or more of xenon, argon and krypton;

one or more propellant tanks configured to store liquid propellant at an intermediate pressure;

one or more electric thrusters operable with the inert gas and pneumatically coupled with the one or more pressurant tanks by way of a first pressure regulator having a low pressure output; and one or more chemical thrusters operable with the liquid propellant, wherein operating the spacecraft includes:

storing the liquid propellant in at least one of the propellant tanks, the propellant tank including an ullage volume that is pneumatically coupled with at least one of the pressurant tanks by way of a second pressure regulator having an output set to the intermediate pressure; and pressurizing the ullage volume with a first portion of the inert gas, the one or more electric thrusters being pneumatically coupled with the ullage volume by way of the first pressure regulator.

12. The method of claim 11, further comprising:
during a first mission phase, operating the chemical thrusters with the liquid propellant; and
during a second mission phase, operating the electric thrusters with the first portion of the inert gas.

13. The method of claim 12, wherein
the one or more electric thrusters are pneumatically coupled with the one or more pressurant tanks by way of a first commandable valve and the first pressure regulator; and
the ullage volume is pneumatically coupled with at least one of the pressurant tanks by way of a second commandable valve and the second pressure regulator.

14. The method of claim 13, wherein the intermediate output pressure setting is at least two times higher than the low output pressure.

15. The method of claim 13, wherein the ullage volume is pneumatically coupled with the one or more electric thrusters by way of a third commandable valve and the first pressure regulator.

16. The method of claim 15, further comprising:
during a third mission phase, operating the electric thrusters with a second portion of the inert gas, wherein the electric thrusters receive the second portion from at least one of the pressurant tanks by way of the first commandable valve and the first pressure regulator.

17. The method of claim 11, wherein the propellant tank includes a diaphragm separating the liquid propellant from the ullage volume.

18. A spacecraft comprising:
a propulsion system, the propulsion system including:
one or more propellant tanks configured to store liquid propellant, the propellant tank including an ullage volume pressurized by an inert gas;
one or more electric thrusters operable with the inert gas at a low pressure and pneumatically coupled with the ullage volume by way of a first pressure regulator having a low pressure output; and
one or more chemical thrusters operable with the liquid propellant; wherein:
the inert gas is one or a mixture of two or more of xenon, argon and krypton.

19. The spacecraft of claim 18, wherein the propellant tank includes a diaphragm separating the liquid propellant from the ullage volume.

20. The spacecraft of claim 18, wherein the ullage volume is pneumatically coupled with the one or more electric thrusters by way of a commandable valve and the first pressure regulator.

* * * * *